2594X
Sheet 1. 2 Sheets.
P Paddleford.
No Printed Specification Available
Spinning Mach.
Patented May 18, 1816.
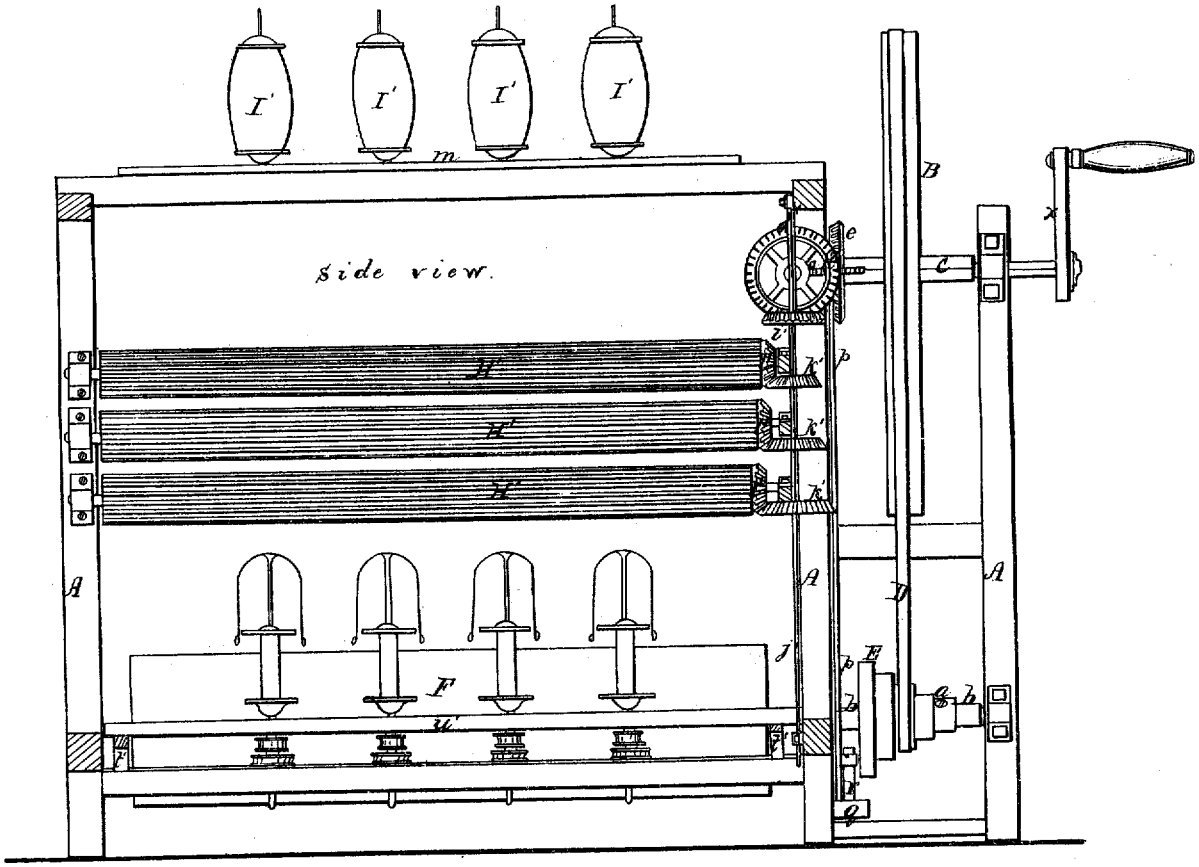
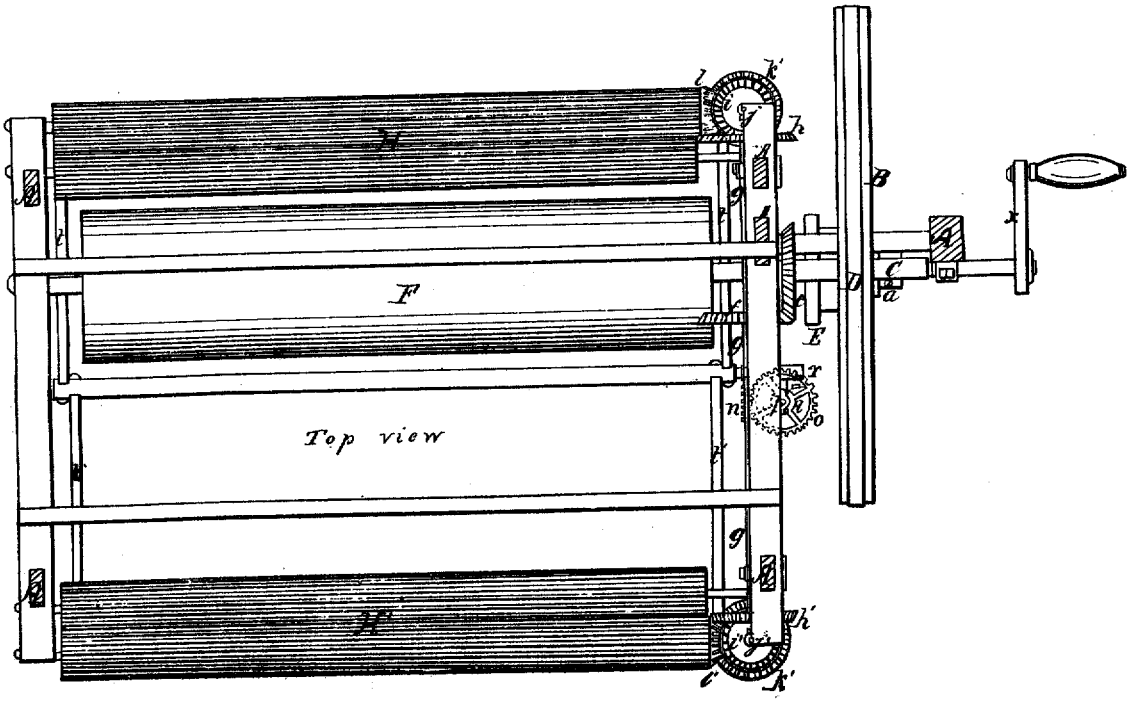
N. PETERS, PHOTO-LITHOGRAPHER, WASHINGTON, D. C.

2594X
Sheet 2. 2 Sheets.
P. Paddleford.
Spinning Mach.
Patented May 18, 1816.
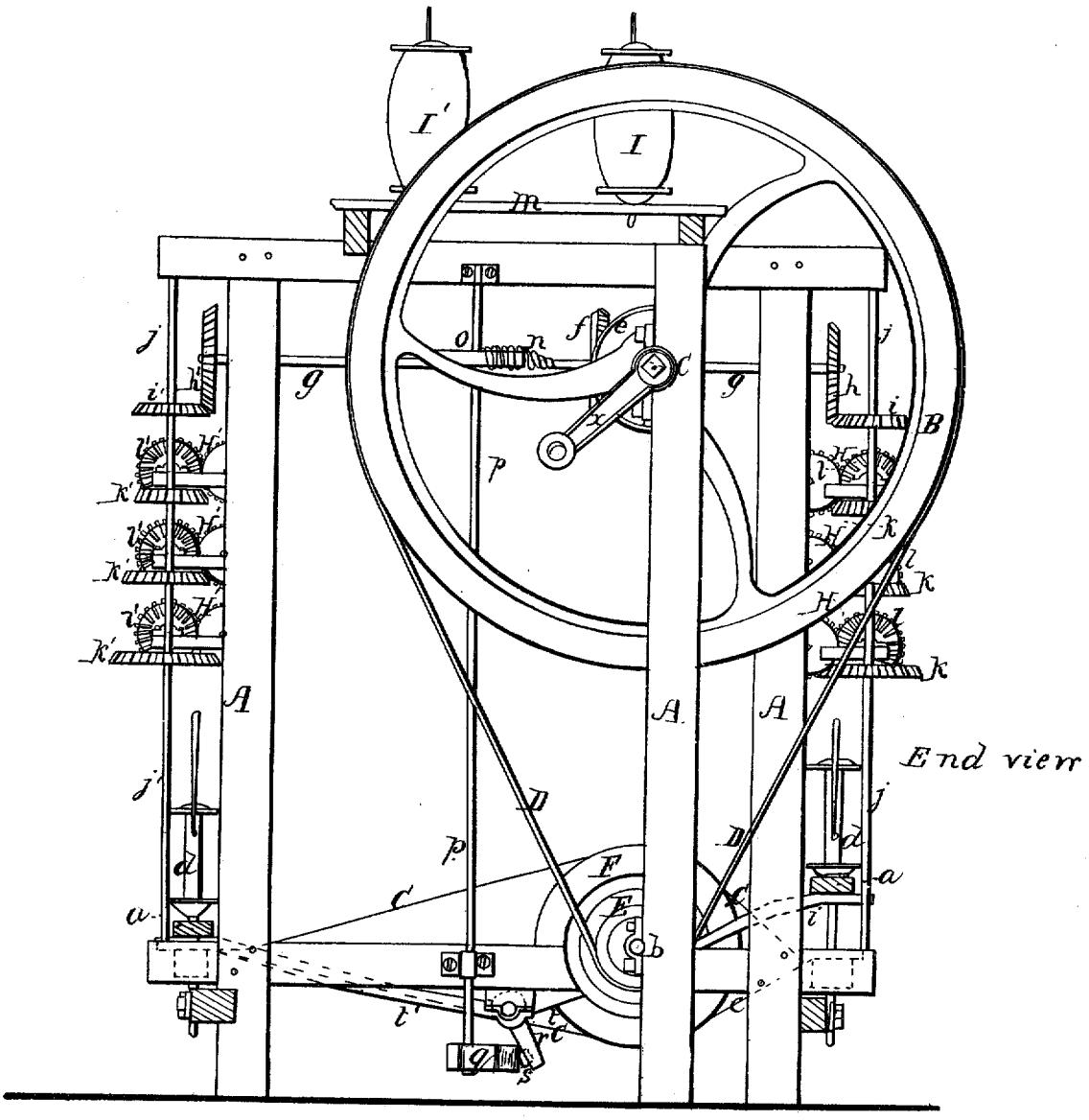
N. PETERS, PHOTO-LITHOGRAPHER, WASHINGTON, D. C.

[illegible]

Peter Paddleford 259AX May 18, 1816
Letters Patent

The Schedule referred to in these Letters Patent and mak-
ing part of the same containing a description in the words
of the said Peter Paddleford himself of his machine for
spinning sheeps wool & Cotton.

The machine is attached to a frame composed of joints
& posts constructed on the usual principles. there being neces-
sarily six posts & the length of the frame depending on the
number of spools to be applied, which may be varied
agreeable to the wishes of the manufacturer & the machine
is so constructed as that spindles are applied and used on
both sides of the frame. Two pair of the posts are rai-
sed near to each other across one end of the frame & motion
is given to the machine by a large wheel moving on a
horizontal axis between these two pair of posts and near
the top thereof and revolving in a direction transverse to
the frame. Around the before mentioned wheel plays
a band which also passes round a conical whirl move-
ably fixed by means of a screw on the axis of the main cyl-
inder lying longitudinally near the bottom of the machine or
frame. around which cylinder are placed the band or bands which
turn the spindles & fliers similar to those used in other cotton
machinery. the conical whirl is used so that by moving the
band to different parts thereof the motion of the spindles
is increased or diminished as occasion may require. and the
whirl is made to slide on the axis of the cylinder. so that it may
be placed in a situation to prevent the main wheel casting
its band. The Main wheel may be turned by means of
a crank or be applied to a water wheel as occasion may
require. On the end of the axis to the main wheel is fixed
a faced cog wheel which gears or matches with another cog
wheel wheel fixed on a horizontal shaft & near the centre [illegible] said shaft transversing the machine. On each end of the last mentioned shaft or axis is fixed another cog wheel each of which on each side of the machine matches with another cog wheel near the upper end of a perpendicular shaft or axis. On this last mentioned shaft or axis are fixed three other cog wheels of different sizes or diameters. each of which by gearing with other wheels on the end of each set of feeding rollers gives motion to each of these set of feeding rollers. The rollers by being firmly fluted draw the roving from the roving spools which are perpendicularly placed on a platform on the top of the machine and conducts it to the fliers, & thence to the spools.

Each thread passes through three pair of fluted rollers which by reason of the difference in size of the wheels on the perpendicular shaft have difference in the speed with which they revolve. thereby drawing out the warp. On the first mentioned horizontal transverse shaft or axis is fixed an endless screw which matches with a Tooth wheel fixed on a perpendicular shaft extending near to the bottom of the machine or frame, On this last mentioned shaft is fixed a heart the rotation of which, acting on an arm in which is inserted a friction pulley. raises and lowers. by means of other arms. the platform on which stand the spools on the spindles thereby equally distributing the yarn on the spools.

Witness

Geo Woodward

Elizabeth Woodward

Peter Paddleford

Drawing made

[illegible] [illegible]